US011983755B2

(12) United States Patent
DeLuca et al.

(10) Patent No.: US 11,983,755 B2
(45) Date of Patent: May 14, 2024

(54) DIGITAL TWIN EXCHANGE FILTERING OF DIGITAL RESOURCES BASED ON OWNED ASSETS

(71) Applicant: International Business Machines Corporation, Armonk, NY (US)

(72) Inventors: Lisa Seacat DeLuca, Bozeman, MT (US); Jeremy R. Fox, Georgetown, TX (US); Zachary A. Silverstein, Austin, TX (US)

(73) Assignee: International Busi Corporation ess Machines, Armonk, NY (US)

( * ) Notice: Subject to any disclaimer, the term of this patent is extended or adjusted under 35 U.S.C. 154(b) by 381 days.

(21) Appl. No.: 17/462,637

(22) Filed: Aug. 31, 2021

(65) Prior Publication Data
US 2023/0062936 A1 Mar. 2, 2023

(51) Int. Cl.
G06Q 30/02 (2023.01)
G06F 16/907 (2019.01)
G06Q 10/0639 (2023.01)
G06Q 30/01 (2023.01)
G06Q 30/0601 (2023.01)

(52) U.S. Cl.
CPC ....... *G06Q 30/0623* (2013.01); *G06F 16/907* (2019.01); *G06Q 10/0639* (2013.01); *G06Q 30/01* (2013.01)

(58) Field of Classification Search
CPC ........... G06Q 30/0623; G06Q 10/0639; G06Q 30/0207–30/0277; G06F 16/907
See application file for complete search history.

(56) References Cited

U.S. PATENT DOCUMENTS

| 9,990,603 | B2 | 6/2018 | Kerrick | |
|---|---|---|---|---|
| 11,119,882 | B2* | 9/2021 | Rakshit | G06F 11/3051 |
| 11,216,261 | B1* | 1/2022 | Moyal | G06F 9/455 |
| 2015/0127483 | A1 | 5/2015 | Elliot | |
| 2015/0249872 | A1 | 9/2015 | Lee | |
| 2016/0335701 | A1 | 11/2016 | Allen et al. | |
| 2018/0357334 | A1* | 12/2018 | Chao | G06F 16/10 |
| 2019/0019144 | A1* | 1/2019 | Gillen | H04L 9/3247 |
| 2019/0122174 | A1* | 4/2019 | Gil | G06Q 10/0833 |
| 2019/0138333 | A1* | 5/2019 | Deutsch | G06Q 10/0631 |
| 2019/0138662 | A1* | 5/2019 | Deutsch | G06F 30/00 |
| 2019/0138970 | A1* | 5/2019 | Deutsch | G06F 9/542 |
| 2019/0156600 | A1* | 5/2019 | Potyrailo | G07C 5/0816 |
| 2019/0236489 | A1 | 8/2019 | Koudal | |
| 2019/0251489 | A1* | 8/2019 | Berti | G06Q 10/0631 |

(Continued)

OTHER PUBLICATIONS

"Digital twin," Wikipedia, Feb. 2020, 16 pages.

(Continued)

*Primary Examiner* — Thuy N Nguyen
(74) *Attorney, Agent, or Firm* — Van Leeuwen & Van Leeuwen; Jared C. Chaney

(57) ABSTRACT

An approach is provided that gathers customer metadata that pertains to the customer's physical assets. This metadata is compared to digital twin metadata that is stored in a digital twin marketplace. Results of the comparison are displayed on the display. The customer makes a selection from the display of one a digital twin template that matches one of the customer's physical assets. The customer then uses the selected digital twin to monitor the matched customer physical asset.

17 Claims, 7 Drawing Sheets

(56) References Cited

U.S. PATENT DOCUMENTS

| | | | |
|---|---|---|---|
| 2019/0251575 A1* | 8/2019 | Berti | G06Q 30/018 |
| 2019/0287079 A1* | 9/2019 | Shiraishi | G07C 5/0841 |
| 2021/0027122 A1* | 1/2021 | Volkerink | G06K 19/025 |
| 2021/0096975 A1* | 4/2021 | DeLuca | G06F 11/3409 |
| 2021/0109837 A1* | 4/2021 | Rakshit | G06F 11/3476 |
| 2021/0149380 A1* | 5/2021 | Rakshit | G05B 19/41875 |
| 2021/0248289 A1* | 8/2021 | Fasano | G05B 17/02 |
| 2021/0374032 A1* | 12/2021 | Rakshit | G06F 11/3093 |
| 2022/0036302 A1* | 2/2022 | Cella | G06Q 10/0834 |
| 2022/0067639 A1* | 3/2022 | Ferrington | H04M 1/72409 |
| 2022/0083976 A1* | 3/2022 | Rakshit | G06Q 10/06315 |
| 2022/0100916 A1* | 3/2022 | Knezevic | G06Q 10/04 |
| 2022/0129606 A1* | 4/2022 | Sundararajan | G06F 30/17 |
| 2022/0137178 A1* | 5/2022 | Hill | G01S 13/765 |
| | | | 342/451 |
| 2022/0198390 A1* | 6/2022 | DeLuca | G06F 40/20 |
| 2023/0039485 A1* | 2/2023 | Karri | G05B 19/4099 |
| 2023/0055641 A1* | 2/2023 | Prasath | G06F 9/451 |
| 2023/0058169 A1* | 2/2023 | Cella | G06F 11/3457 |
| 2023/0196688 A1* | 6/2023 | Kobel | G06F 3/011 |
| | | | 345/633 |

OTHER PUBLICATIONS

"Digital twin: Helping machines tell their story," International Business Machines Corporation, IBM Watson IoT, Feb. 2020, 11 pages.

"Digital Twin Market Size Worth $26.07 Billion By 2025 | CAGR 38.2%," Grand View Research, Dec. 2018, 7 pages.

"Digital Twins in Logistics," DHL Trend Research, Feb. 2020, 39 pages.

Steer, "Will There Be A Digital Twin For Everything And Everyone?" Digital List Mag, May 2018, 7 pages.

* cited by examiner

DIGITAL TWIN EXCHANGE FILTERING OF DIGITAL RESOURCES BASED ON OWNED ASSETS

BACKGROUND

A digital twin is a virtual model designed to accurately reflect a physical object. The object being studied—for example, a wind turbine—is outfitted with various sensors related to vital areas of functionality. These sensors produce data about different aspects of the physical object's performance, such as energy output, temperature, weather conditions and more. This data is then relayed to a processing system and applied to the digital copy. Once informed with such data, the virtual model can be used to run simulations, study performance issues and generate possible improvements, all with the goal of generating valuable insights—which can then be applied back to the original physical object. A digital twin exchange, or marketplace, allows vendors to share their digital twin digital resources with end users.

SUMMARY

An approach is provided that gathers customer metadata that pertains to the customer's physical assets. This metadata is compared to digital twin metadata that is stored in a digital twin marketplace. Results of the comparison are displayed on the display. The customer makes a selection from the display of one a digital twin template that matches one of the customer's physical assets. The customer then uses the selected digital twin to monitor the matched customer physical asset.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
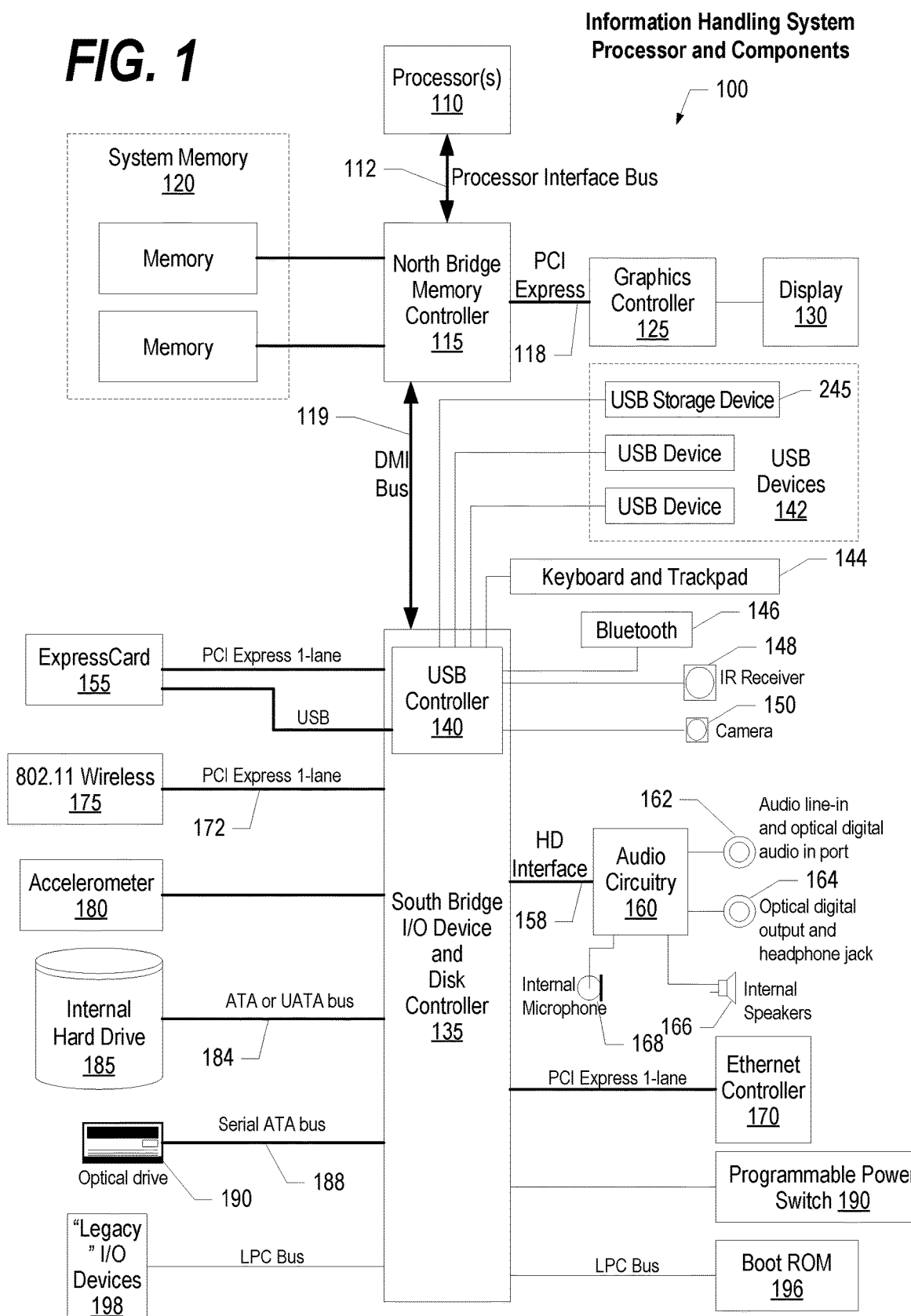
FIG. 1 is a block diagram of a data processing system in which the methods described herein can be implemented.

FIGS. 1-7 describe an approach that limit digital twin marketplace content based on owned or predicted ownership of a customer's physical assets. In the approach, content providers create digital twin templates and offers them within a digital twin marketplace. The digital twin includes base information such as: User/Operating Manuals, Bill of Material, Warranty Maintenance Plans/procedures, Specifications 3D model/CAD drawings, Fault codes, scheduled maintenance plans, operating manuals, Owner, Change in Ownership, Safety notifications/alerts, Repair procedures, troubleshooting tips, and the like. The digital twin is associated with a make/model of physical asset.

A customer, or end user, creates or browses the marketplace. The customer has a set of associated physical assets. These assets may be determined based on: An enterprise asset management solution, A purchase history ex. credit card transactions, A 3rd party account that reads data from the asset (e.g., sensor readings, APIs to control the device, etc.), A current proximity to physical assets (e.g., nearby a specific HVAC unit, previous proximity, in the past the individual was operating or nearby some asset technician or work order history, etc.), and the like. The identified physical assets are compared against the physical assets associated with the digital twins. If no overlap is found, the marketplace displays a default view and may recommend that the end user purchase a physical asset based identified metadata.

However, if an overlap is found, an icon displays when a physical asset is owned by the user. The user has the option to filter based on owned assets and other criteria. For example, the user has the option to filter based on owned assets within a given proximity. The approach displays information that highlights the owned assets separate from the regular (non-matching) results.

As a use-case example consider a customer that works for an underground mining company that is a large customer to a manufacturer of mining trucks. The customer uses a computer system to browse a digital twin exchange. When the customer creates their account, it's cross referenced with the digital twin exchange environment and the system identifies that the customer owns certain mining equipment. While there are thousands of digital twins for the various types and combinations of mining machinery, the system displays the ones that are compatible with the assets owned by the customer.

A physical asset at any given time has different sensor/data output that describe how it is being used. This detail, in combination with variations in e-commerce add-ons or variables, can be used to recommend one digital twin resource over another. For example, the approach can use a particular set of asset operating history based on how the customer operates the asset. Using the digital twin within the means and purpose that the user uses in operating that behavioral, in essence mimicking the way in which the user is utilizing the physical assets with normal behavior. This may include characteristics such as the speed in which it's driven, the type of fuel that is used, the weight distribution based on the fuel load and capacity. Anything that may be used to modify the physical asset in real life can be accounted for within the digital twin. In addition, if the asset is new, used, severely aging, these are all factors that can be included within the modeling for the digital twin.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
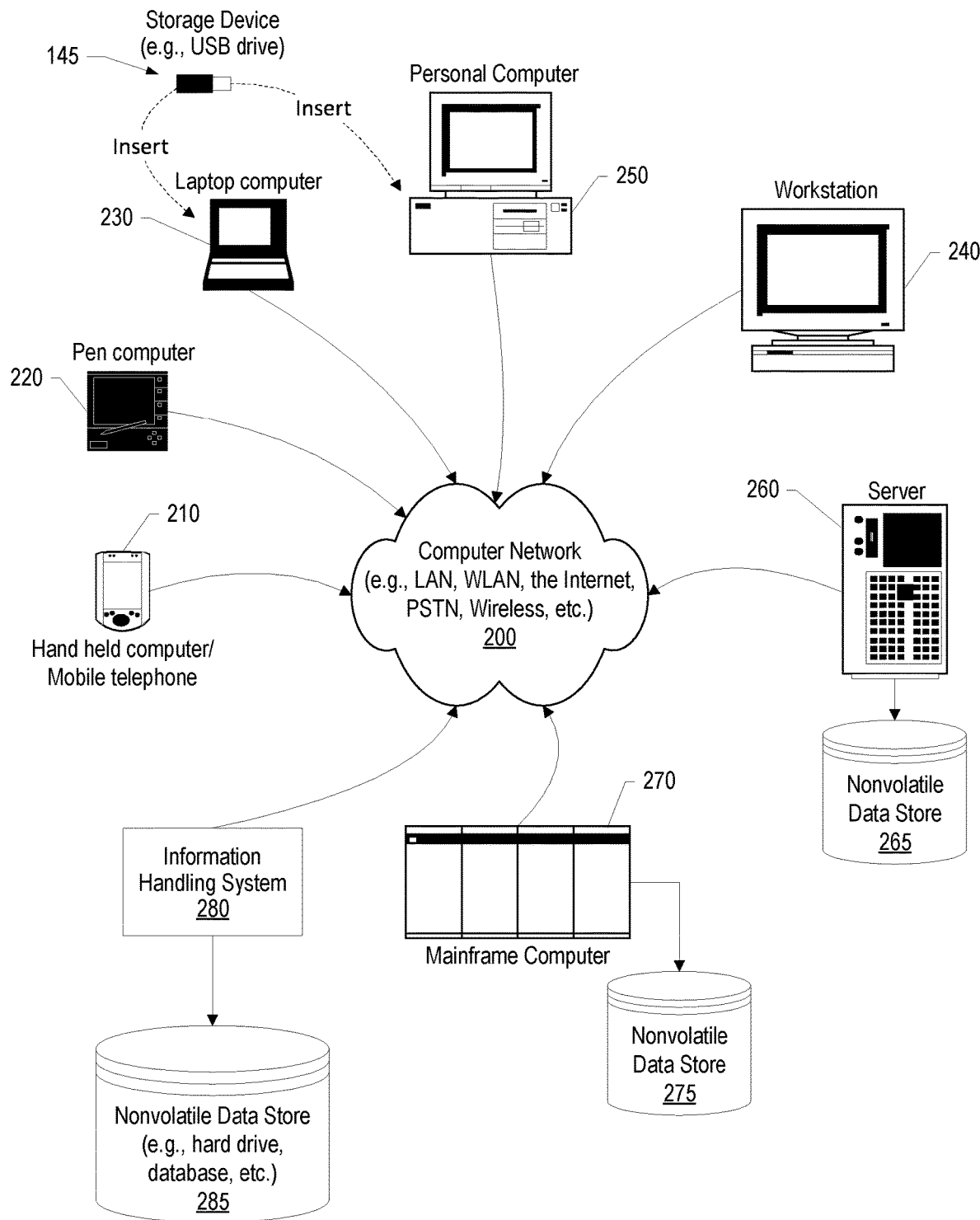
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
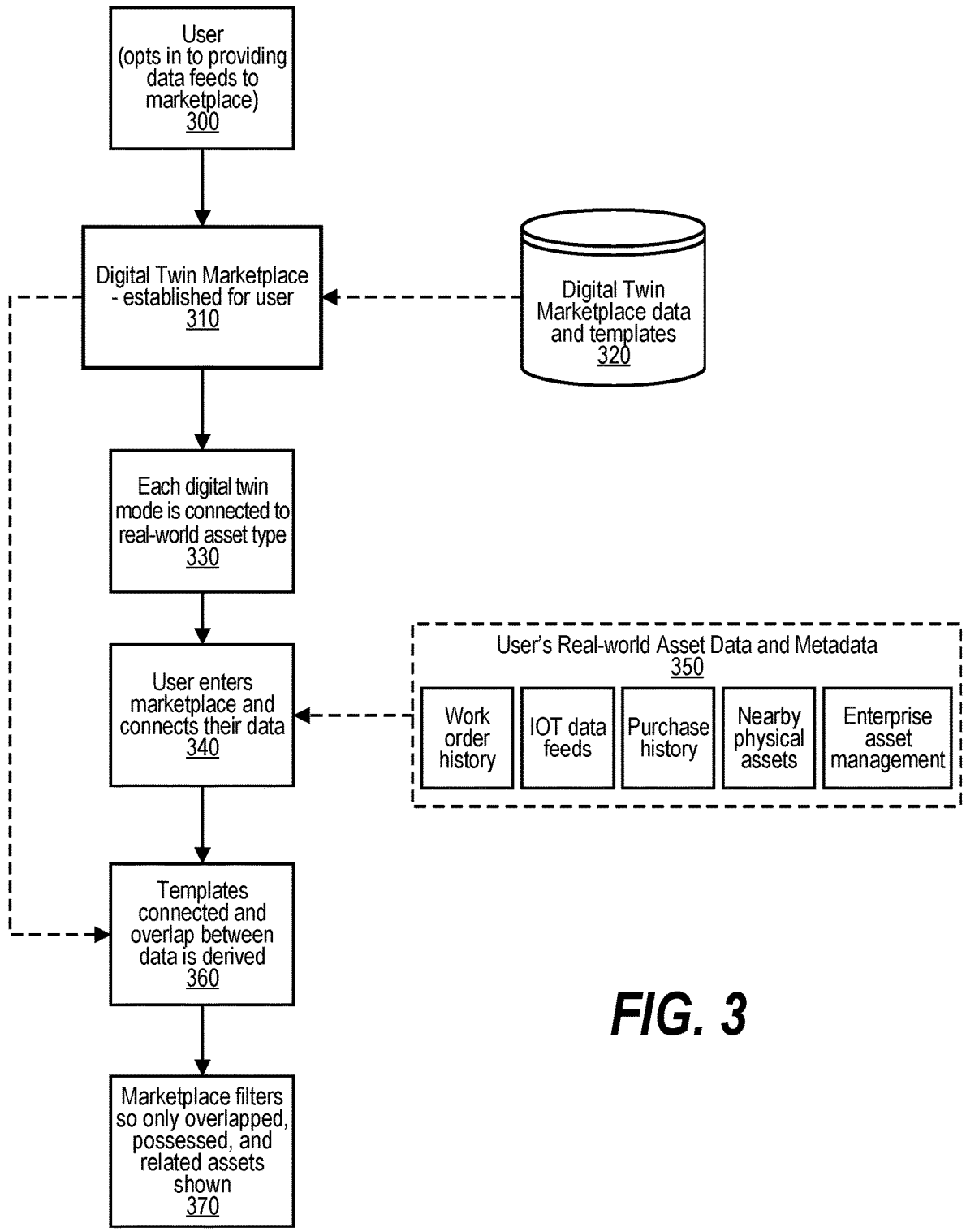
FIG. 3 is a diagram depicting overall interaction between end users and content providers to provide appropriate, customized, digital twin marketplace data to each end user.

FIG. 3 is a diagram depicting overall interaction between end users and content providers to provide appropriate, customized, digital twin marketplace data to each end user. At step 300, the user opts in to providing data feeds to the digital twin marketplace. At step 310, the process establishes a relationship between the user and the digitals twin marketplace. This relationship allows the user's assets to be related to templates and metadata found in the digital twin marketplace. The digital twin marketplace data is retrieved from data store 320. At step 330, the process provides for each digital twin mode to be connected to a real-world asset type. In one embodiment, a high-level connection is made based on a make and model of the asset. At step 340, the user enters the digital twin marketplace and connects their data to templates and metadata found in the digital twin marketplace. Various user data stores and feeds are retrieved to connect to the marketplace. User's asset data stores and feeds with asset data and metadata include data stores and feeds found in 350, such as work order histories, Internet-of-Things (IOT) data feeds, purchase histories, nearby physical asset data feeds (e.g., Bluetooth connections, other wireless connections, etc.), enterprise asset management data stores, and the like. At step 360, the process connects to templates from the digital twin marketplace and derives overlaps between the user's asset data and the marketplace data. At step 370, the process filters marketplace data so that overlapped, possessed, and related user (customer) assets are highlighted and displayed to the user.

Figure 4:
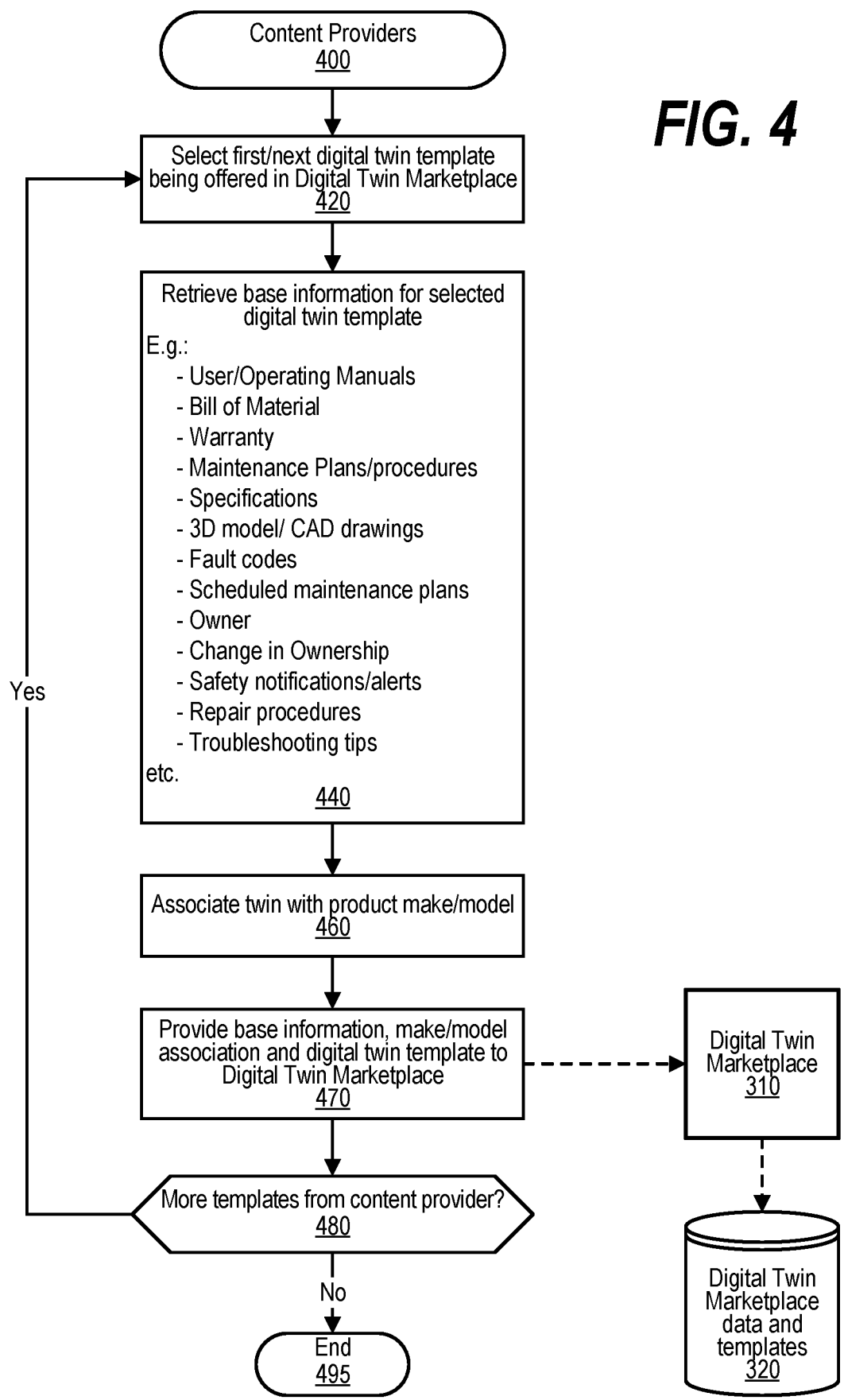
FIG. 4 is a flowchart showing steps taken by the content providers to share digital twin templates and associated metadata in a digital twin marketplace.

FIG. 4 is a flowchart showing steps taken by the content providers to share digital twin templates and associated metadata in a digital twin marketplace. FIG. 4 processing commences at 400 and shows the steps taken by content providers to provide their content to the digital twin marketplace. At step 420, the process selects the first digital twin template being offered by the provider to be included in the Digital Twin Marketplace.

At step 440, the process retrieves base information (metadata) corresponding to the selected digital twin template. Examples of this information, or metadata can include User/Operating Manuals, Bill of Materials, Warranty information, Maintenance Plans and procedures, Specifications—3D models, CAD drawings, Fault codes, Scheduled maintenance plans, Owner information, Change in Ownership information, Safety notifications and alerts, Repair procedures, Troubleshooting tips, and the like.

At step 460, the process associates the digital twin being submitted by the content provider with a product make and/or model. At step 470, the process provides the base information (metadata), make/model association data, and digital twin template to Digital Twin Marketplace 310. The received metadata, including the make and model data, and the digital twin template is stored in digital twin data store 320.

The process determines as to whether there are more templates being provided from this content provider (decision 480). If there are more templates being provided from this content provider, then decision 480 branches to the 'yes' branch which loops back to step 420 to retrieve the information corresponding to the next digital twin template as described above. This looping continues until there are no more templates being provided from this content provider, at which point decision 480 branches to the 'no' branch exiting the loop and processing ends at 495.

Figure 5:
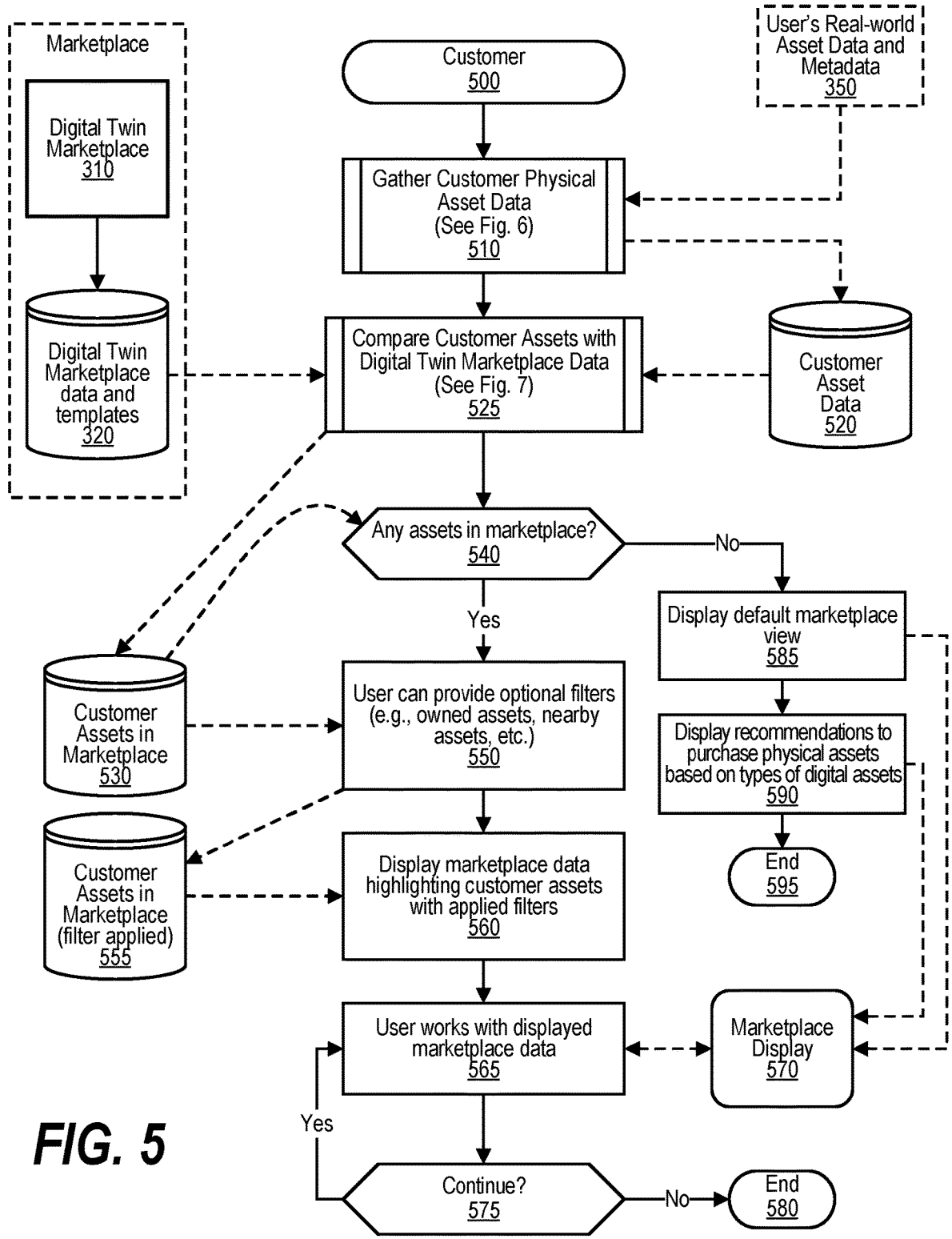
FIG. 5 is a flowchart showing steps taken by the end users to use a digital twin marketplace to receive appropriate, customized digital twin marketplace information.

FIG. 5 is a flowchart showing steps taken by the end users to use a digital twin marketplace to receive appropriate, customized digital twin marketplace information. FIG. 5 processing commences at 500 and shows the steps taken by a customer that wishes to use the digital twin marketplace. At predefined process 510, the process performs the Gather Customer Physical Asset Data routine (see FIG. 6 and corresponding text for processing details). This routine gathers data from the user's real-world asset data and metadata 350 and stores the gathered information into customer asset data store 520.

Figure 7:
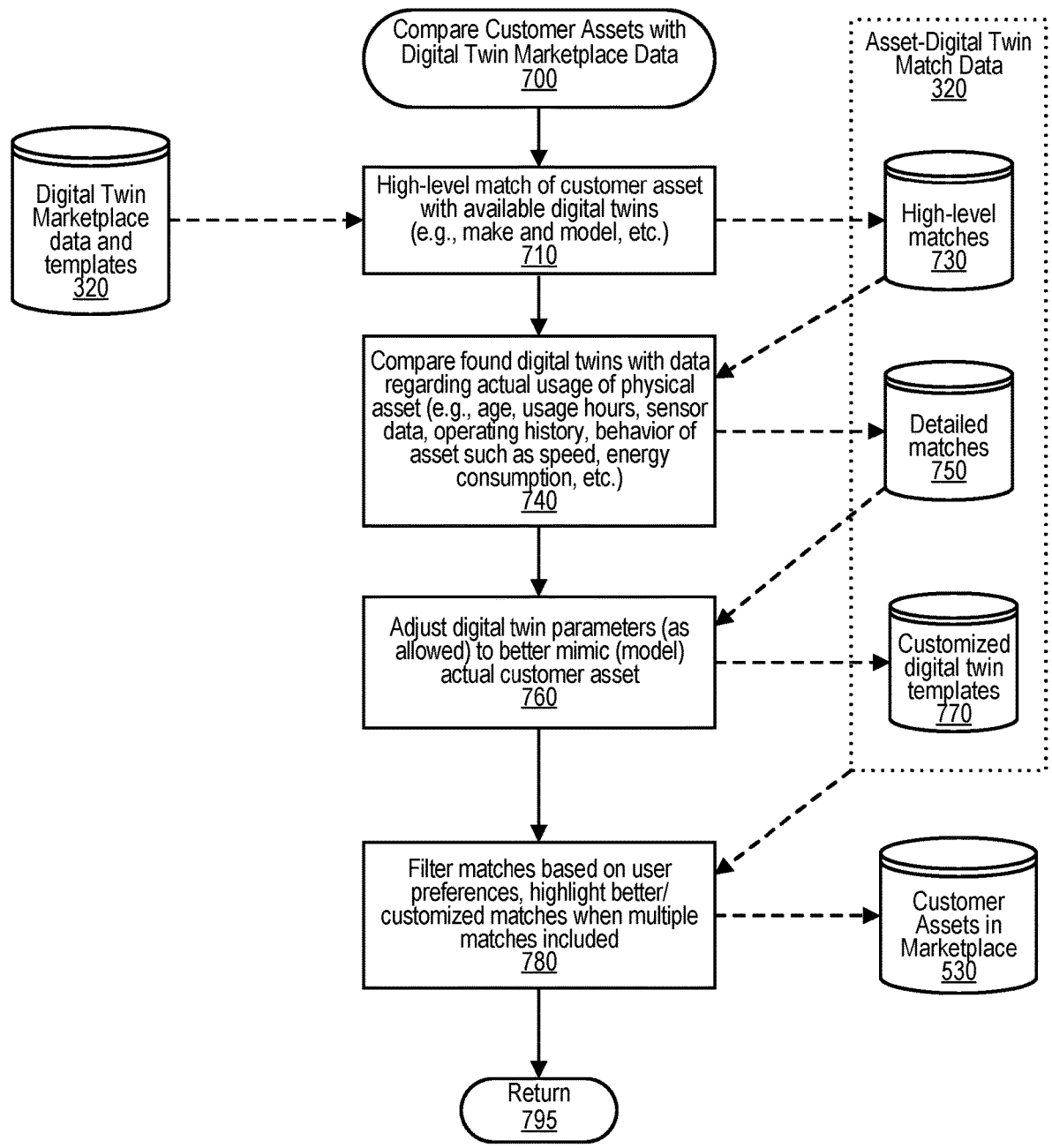
FIG. 7 is a flowchart showing steps taken to compare end user asset data with digital twin marketplace data to provide appropriate, customized digital twin marketplace information to the end user.

At predefined process 525, the process performs the Compare Customer Assets with Digital Twin Marketplace Data routine (see FIG. 7 and corresponding text for processing details). This routine retrieves data from digital twin marketplace 310 (marketplace data and templates data store 320) and compares this data with the customer's asset data that was stored in data store 520.

The process determines as to whether the customer has any assets that are included in the digital twin marketplace (decision 540). If the customer has any assets that are included in the digital twin marketplace, then decision 540 branches to the 'yes' branch to perform steps 550 through 580. On the other hand, if the customer does not have any assets that are included in the digital twin marketplace, then decision 540 branches to the 'no' branch to perform steps 585 through 595.

The process performs steps 550 through 580 when the customer has any assets that are included in the digital twin marketplace. At step 550, the receives any optional filters that are provided by the user. For example, the customer may only wish to view matches for the customer's owned assets, for nearby customer assets, and the like. At step 560, the process displays the marketplace data on display device 570 with the process further highlighting the customer's assets with any filters provided by the user being applied. At step 565, the user works with the displayed marketplace data. For example, the user may select a digital twin template matching one of the customer's assets and used the selected digital twin template to monitor usage of customer's physical asset. The process determines as to whether the customer wishes to continue using the digital twin marketplace (decision 575). If the customer wishes to continue using the digital twin marketplace, then decision 575 branches to the 'yes' branch which loops back to step 565 to allow the user to continue working with the digital twin marketplace. This looping continues until the customer no longer wishes to continue using the digital twin marketplace, at which point decision 575 branches to the 'no' branch exiting the loop with processing ending at 580.

The process performs steps 585 through 595 when the customer does not have any assets that are included in the digital twin marketplace. At step 585, the process displays a default marketplace view on display device 570. At step 590, the process displays any recommendations that might be made to the customer to purchase physical assets based on the types of digital assets. FIG. 5 processing thereafter ends at 595.

Figure 6:
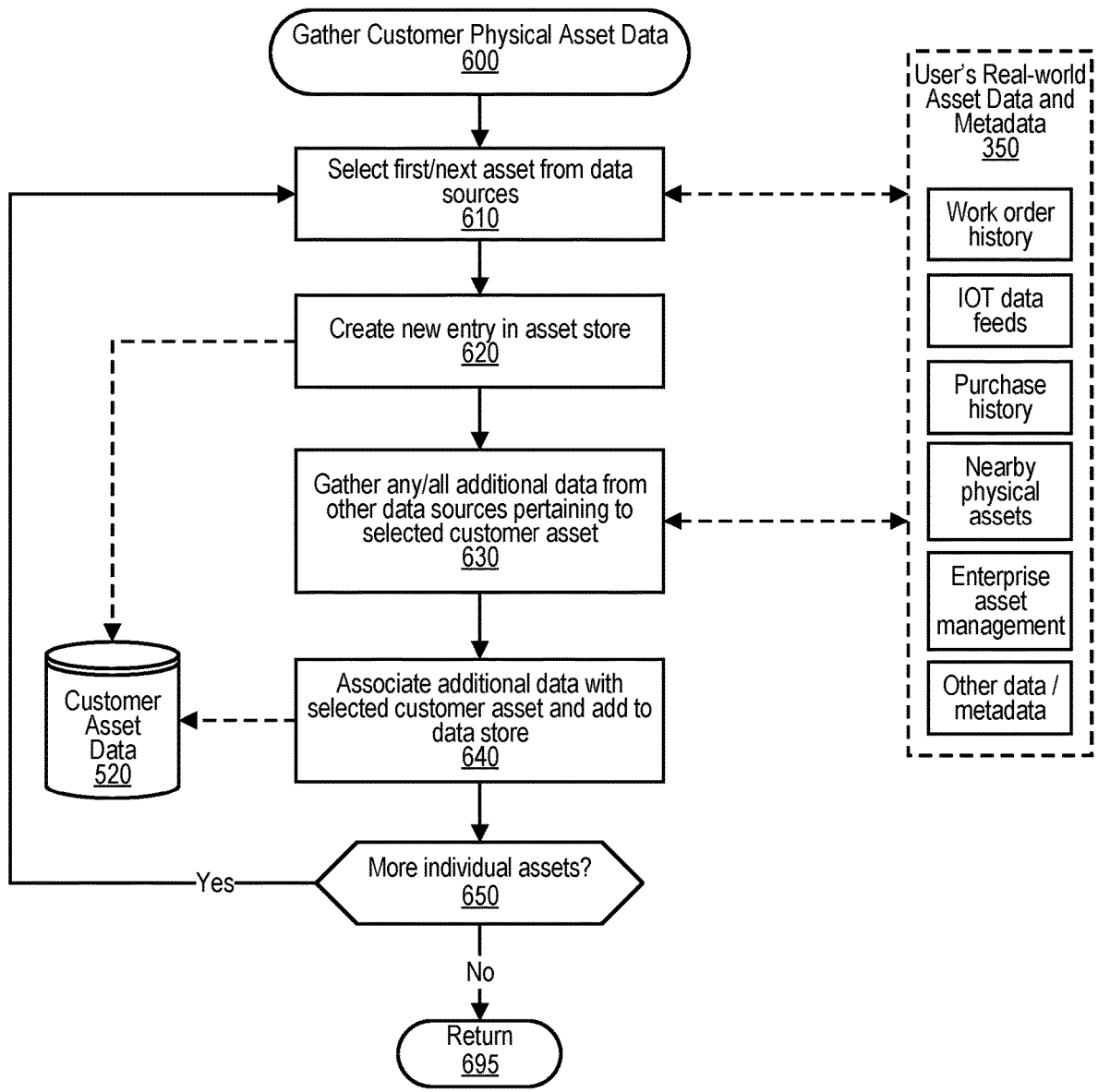
FIG. 6 is a flowchart showing steps taken to gather end user physical asset data that might correspond to templates included in the digital twin marketplace.

FIG. 6 is a flowchart showing steps taken to gather end user physical asset data that might correspond to templates included in the digital twin marketplace. FIG. 6 processing commences at 600 and shows the steps taken by the routine that gathers the customer's physical asset data. This routine is called by the process shown in FIG. 5. At step 610, the process selects the first asset from user's data sources and data feeds 350.

At step 620, the process creates a new entry in asset store 520 corresponding to the asset selected in step 610. At step 630, the process gathers any and all additional data from other data sources pertaining to the selected customer asset. This additional data is gathered in other user data sources and feeds 350. At step 640, the process associates the additional data with the selected customer asset and adds the additional to data store 520.

The process determines as to whether there are more individual assets to select and process as shown above (decision 650). If there are more individual assets to select and process, then decision 650 branches to the 'yes' branch which loops back to step 610 to select and process the next asset from user data sources and data feeds 350. This looping continues until there are no more individual assets to select and process, at which point decision 650 branches to the 'no' branch exiting the loop. FIG. 6 processing thereafter returns to the calling routine (see FIG. 5) at 695.

FIG. 7 is a flowchart showing steps taken to compare end user asset data with digital twin marketplace data to provide appropriate, customized digital twin marketplace information to the end user. FIG. 7 processing commences at 700 and shows the steps taken by a routine that compares customer assets with templates and metadata found in Digital Twin Marketplace data store 320. This routine is called by the process shown in FIG. 5.

At step 710, the process performs a high-level match of the customer (user) asset with the metadata of available digital twins found in data store 320. In one embodiment, a high-level match is made based on a make and model of the asset. The process stores this high-level matching data in data store 730. At step 740, the process compares the digital twins found with data regarding actual usage data of the user's actual physical asset. This actual usage data can include metadata such as age, usage hours, sensor data, operating history, behavior of asset such as speed, energy consumption, and the like. The process stores detailed matching data in data store 750.

At step 760, the process adjusts digital twin parameters, as allowed, to better mimic, or model, the actual customer asset. This results in customized digital twin templates that the process stores in data store 770. At step 780, the process filters the matches based on any provided user preferences. The process further highlights better or more customized matches when multiple matches are included in the digital twin marketplace. The process stores the resulting customer assets found in the digital twin marketplace in data store 530. FIG. 7 processing thereafter returns to the calling routine (see FIG. 5) at 795.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a display accessible by the processor, the method comprising:
    gathering customer metadata pertaining to a plurality of customer physical assets, the gathering performed by:
        scanning wireless signals from the customer physical assets that are within range of a customer wireless scanner; and
        receiving the metadata from the first customer physical asset via the wireless signals;
    comparing the customer metadata to a plurality of digital twin metadata stored in a digital twin marketplace, wherein the customer metadata includes an age of the customer physical asset and an operating history of the customer physical asset;
    displaying a result of the comparison on the display;
    receiving a selection, from the displayed results, of a digital twin template that matches one of the customer's physical assets;
    connecting the selected digital twin template, wherein the connection provides a plurality of data feeds, that include at least one Internet-of-Things (IOT) data feed, from the matched customer physical assets to the connected selected digital twin template; and
    monitoring using the selected digital twin to monitor the matched customer physical asset, wherein the monitoring monitors usage of the matched customer asset.

2. The method of claim 1 wherein the gathering of customer metadata further comprises:
    retrieving a set of metadata from one or more data stores wherein at least one of the data stores is selected from a group consisting of a work order history, a purchase history, and an enterprise asset management store.

3. The method of claim 1 wherein the comparing further comprises:
    matching the customer metadata of a model identifier corresponding to a first customer physical asset with the plurality of digital twin metadata, the result of the matching being a plurality of high-level matches; and
    comparing the plurality of high-level matches with a set of actual usage data corresponding to the first customer physical asset, the result of the comparing being the digital twin template that matches the first customer physical asset.

4. The method of claim 3 further comprising:
    adjusting one or more digital twin template parameters with data that mimics one or more characteristics of the matching first customer physical asset.

5. The method of claim 1 wherein the displaying further comprises:
    matching the customer metadata of a model identifier corresponding to each of the customer physical assets with the plurality of digital twin metadata, the result of the matching being a plurality of high-level matches;
    comparing the plurality of high-level matches with a set of actual usage data corresponding to each of the customer physical assets; and
    displaying the plurality of high-level matching, wherein the displaying further highlights the customer physical assets based on the comparison with the set of actual usage data.

6. The method of claim 1 wherein the displaying further comprises:
- filtering the plurality of digital twin templates based on the results of the comparing so that the one or more customer metadata that matches one or more of the digital twin metadata are displayed; and
- inhibiting display of the digital twin metadata that fail to match at least one of the one or more customer metadata.

7. An information handling system comprising:
one or more processors;
a memory coupled to at least one of the processors;
a display accessible by at least one of the processors; and
a set of computer program instructions stored in the memory and executed by at least one of the processors in order to perform actions comprising:
- gathering customer metadata pertaining to a plurality of customer physical assets, the gathering performed by:
  - scanning wireless signals from the customer physical assets that are within range of a customer wireless scanner; and
  - receiving the metadata from the first customer physical asset via the wireless signals;
- comparing the customer metadata to a plurality of digital twin metadata stored in a digital twin marketplace, wherein the customer metadata includes an age of the customer physical asset and an operating history of the customer physical asset;
- displaying a result of the comparison on the display;
- receiving a selection, from the displayed results, of a digital twin template that matches one of the customer's physical assets;
- connecting the selected digital twin template, wherein the connection provides a plurality of data feeds, that include at least one Internet-of-Things (IOT) data feed, from the matched customer physical assets to the connected selected digital twin template; and
- monitoring using the selected digital twin to monitor the matched customer physical asset, wherein the monitoring monitors usage of the matched customer asset.

8. The information handing system of claim 7 wherein the gathering of customer metadata further comprises:
- retrieving a set of metadata from one or more data stores wherein at least one of the data stores is selected from a group consisting of a work order history, a purchase history, and an enterprise asset management store.

9. The information handing system of claim 7 wherein the comparing further comprises:
- matching the customer metadata of a model identifier corresponding to a first customer physical asset with the plurality of digital twin metadata, the result of the matching being a plurality of high-level matches; and
- comparing the plurality of high-level matches with a set of actual usage data corresponding to the first customer physical asset, the result of the comparing being the digital twin template that matches the first customer physical asset.

10. The information handing system of claim 9 wherein the actions further comprise:
- adjusting one or more digital twin template parameters with data that mimics one or more characteristics of the matching first customer physical asset.

11. The information handing system of claim 7 wherein the displaying further comprises:
- matching the customer metadata of a model identifier corresponding to each of the customer physical assets with the plurality of digital twin metadata, the result of the matching being a plurality of high-level matches;
- comparing the plurality of high-level matches with a set of actual usage data corresponding to each of the customer physical assets; and
- displaying the plurality of high-level matching, wherein the displaying further highlights the customer physical assets based on the comparison with the set of actual usage data.

12. The information handing system of claim 7 wherein the displaying further comprises:
- filtering the plurality of digital twin templates based on the results of the comparing so that the one or more customer metadata that matches one or more of the digital twin metadata are displayed; and
- inhibiting display of the digital twin metadata that fail to match at least one of the one or more customer metadata.

13. A computer program product comprising:
a computer readable storage medium, comprising computer program code that, when executed by an information handling system, executes instructions that perform actions comprising:
- gathering customer metadata pertaining to a plurality of customer physical assets, the gathering performed by:
  - scanning wireless signals from the customer physical assets that are within range of a customer wireless scanner; and
  - receiving the metadata from the first customer physical asset via the wireless signals;
- comparing the customer metadata to a plurality of digital twin metadata stored in a digital twin marketplace, wherein the customer metadata includes an age of the customer physical asset and an operating history of the customer physical asset;
- displaying a result of the comparison on the display;
- receiving a selection, from the displayed results, of a digital twin template that matches one of the customer's physical assets;
- connecting the selected digital twin template, wherein the connection provides a plurality of data feeds, that include at least one Internet-of-Things (IOT) data feed, from the matched customer physical assets to the connected selected digital twin template; and
- monitoring using the selected digital twin to monitor the matched customer physical asset, wherein the monitoring monitors usage of the matched customer asset.

14. The computer program product of claim 13 wherein the gathering of customer metadata further comprises:
- retrieving a set of metadata from one or more data stores wherein at least one of the data stores is selected from a group consisting of a work order history, a purchase history, and an enterprise asset management store.

15. The computer program product of claim 13 wherein the comparing further comprises:
- matching the customer metadata of a model identifier corresponding to a first customer physical asset with the plurality of digital twin metadata, the result of the matching being a plurality of high-level matches; and
- comparing the plurality of high-level matches with a set of actual usage data corresponding to the first customer physical asset, the result of the comparing being the digital twin template that matches the first customer physical asset.

16. The computer program product of claim 15 wherein the actions further comprise:
   adjusting one or more digital twin template parameters with data that mimics one or more characteristics of the matching first customer physical asset.

17. The computer program product of claim 13 wherein the displaying further comprises:
   matching the customer metadata of a model identifier corresponding to each of the customer physical assets with the plurality of digital twin metadata, the result of the matching being a plurality of high-level matches;
   comparing the plurality of high-level matches with a set of actual usage data corresponding to each of the customer physical assets; and
   displaying the plurality of high-level matching, wherein the displaying further highlights the customer physical assets based on the comparison with the set of actual usage data.

* * * * *